(12) United States Patent
Austrheim

(10) Patent No.: US 11,807,457 B2
(45) Date of Patent: Nov. 7, 2023

(54) SYSTEM FOR DISTRIBUTING HEAVY BINS IN A STORAGE GRID

(71) Applicant: Autostore Technology AS, Nedre Vats (NO)

(72) Inventor: Trond Austrheim, Etne (NO)

(73) Assignee: Autostore Technology AS, Nedre Vats (NO)

( * ) Notice: Subject to any disclaimer, the term of this patent is extended or adjusted under 35 U.S.C. 154(b) by 643 days.

(21) Appl. No.: 16/963,319

(22) PCT Filed: Jan. 21, 2019

(86) PCT No.: PCT/EP2019/051312
§ 371 (c)(1),
(2) Date: Jul. 20, 2020

(87) PCT Pub. No.: WO2019/145237
PCT Pub. Date: Aug. 1, 2019

(65) Prior Publication Data
US 2021/0371202 A1    Dec. 2, 2021

(30) Foreign Application Priority Data
Jan. 26, 2018   (NO) .................................. 20180124

(51) Int. Cl.
*G06F 7/00* (2006.01)
*B65G 1/137* (2006.01)
(Continued)

(52) U.S. Cl.
CPC ......... *B65G 1/1371* (2013.01); *B65G 1/0464* (2013.01); *G05B 11/01* (2013.01); *B65G 2203/0258* (2013.01)

(58) Field of Classification Search
CPC ................ B65G 1/1371; B65G 1/0464; B65G 2203/0258; B65G 1/04; G05B 11/01
(Continued)

(56) References Cited

U.S. PATENT DOCUMENTS

| 2012/0290125 | A1 | 11/2012 | Perry |
| 2018/0231973 | A1* | 8/2018 | Mattingly ............... G06F 3/011 |
| 2019/0152701 | A1* | 5/2019 | Eck ......................... B65G 67/24 |

FOREIGN PATENT DOCUMENTS

| CN | 105858046 B | * 12/2018 | ........... B65G 1/1371 |
| CN | 109689545 A | * 4/2019 | ........... B65G 1/0464 |

(Continued)

OTHER PUBLICATIONS

International Search Report issued in Application No. PCT/EP2019/051312, dated on Oct. 1, 2019 (3 pages).
(Continued)

*Primary Examiner* — Yolanda R Cumbess
(74) *Attorney, Agent, or Firm* — Osha Bergman Watanabe & Burton LLP

(57) ABSTRACT

A method for storing product items in storage bins in a storage system includes a bin storing grid in which storage bins are stored above each other in columns. The method includes: inserting product items to or retrieving product items from the respective storage bins at a port; determining a weight for each storage bin after one or more product items have been inserted to or retrieved from the storage bin; determining a storage position for the storage bin in the bin storing grid based on the weight; and transporting the storage bin from the port to the determined storage position by means of a vehicle and a bin lift device provided on each vehicle.

8 Claims, 8 Drawing Sheets

(51) Int. Cl.
*B65G 1/04* (2006.01)
*G05B 11/01* (2006.01)

(58) Field of Classification Search
USPC .................................................. 700/213–217
See application file for complete search history.

(56) References Cited

FOREIGN PATENT DOCUMENTS

| | | | |
|---|---|---|---|
| DE | 4203823 C2 * | 3/2001 | ............... B65G 1/04 |
| EP | 0767113 A2 | 4/1997 | |
| GB | 2517264 A | 2/2015 | |
| JP | H05-170552 A | 7/1993 | |
| JP | H06-67442 U | 9/1994 | |
| WO | 2006/074208 A1 | 7/2006 | |
| WO | 2015185628 A2 | 12/2015 | |
| WO | 2017211640 A1 | 12/2017 | |

OTHER PUBLICATIONS

Written Opinion issued in International Application PCT/EP2019/051312, dated Oct. 1, 2019 (8 pages).
Search Report issued in Norwegian Application No. 20180124, dated Aug. 24, 2018 (2 pages).

* cited by examiner

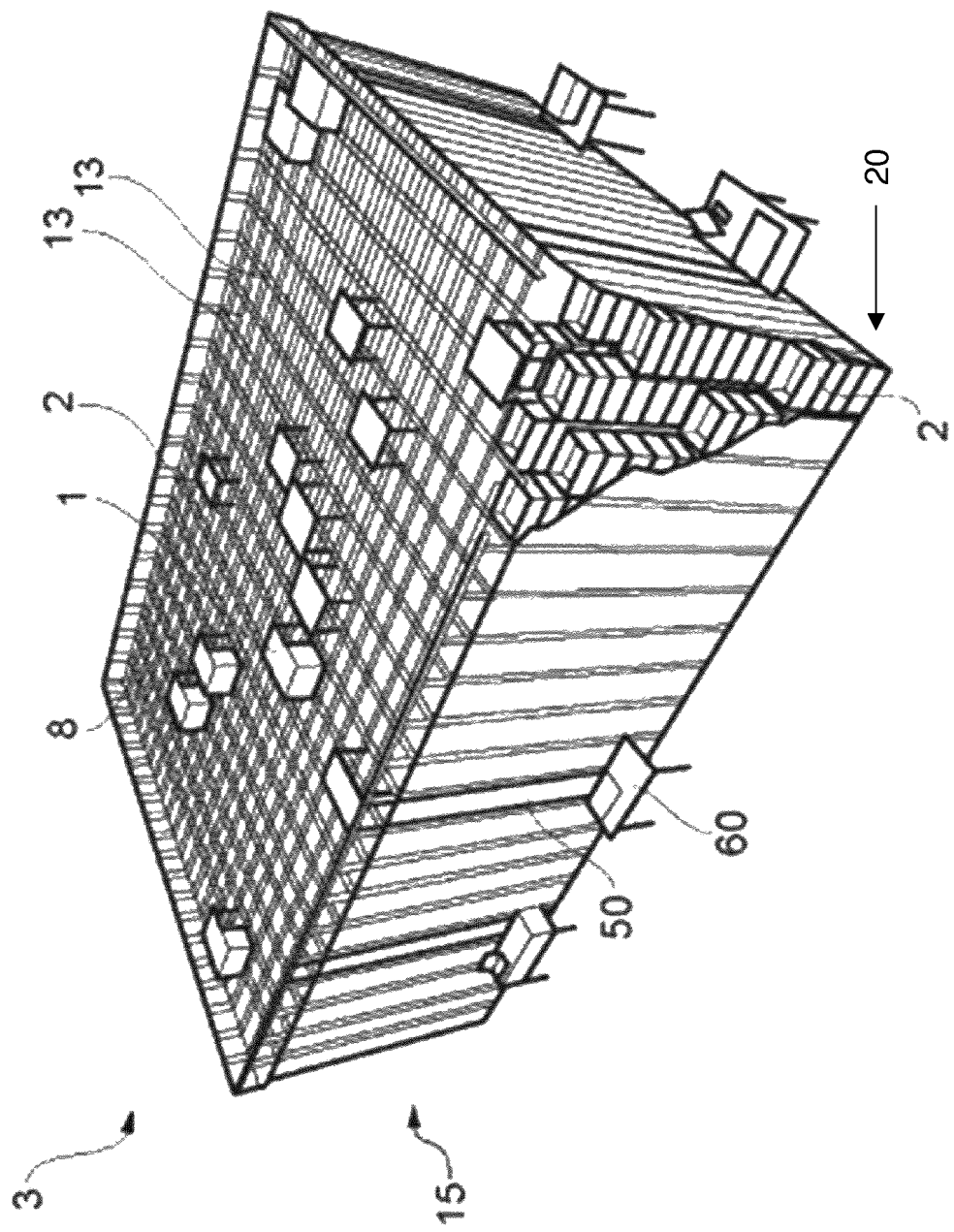
Fig. 1: Prior art

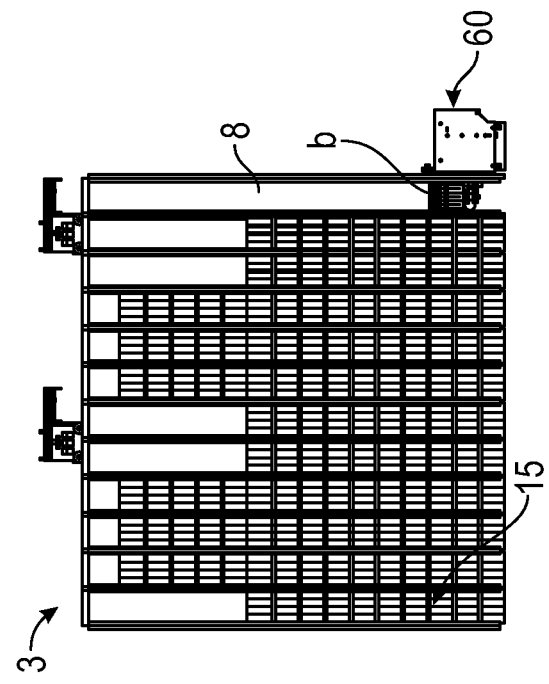
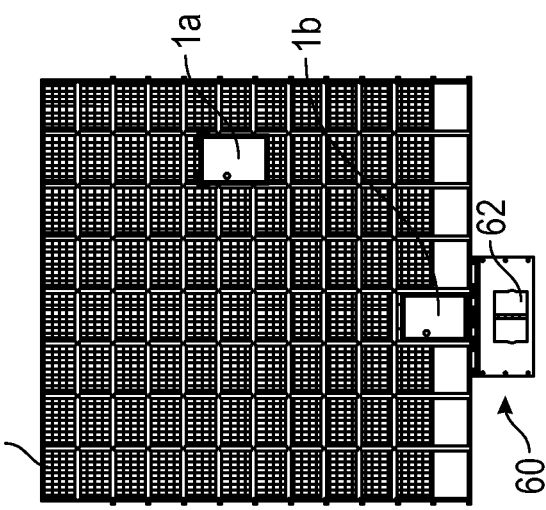
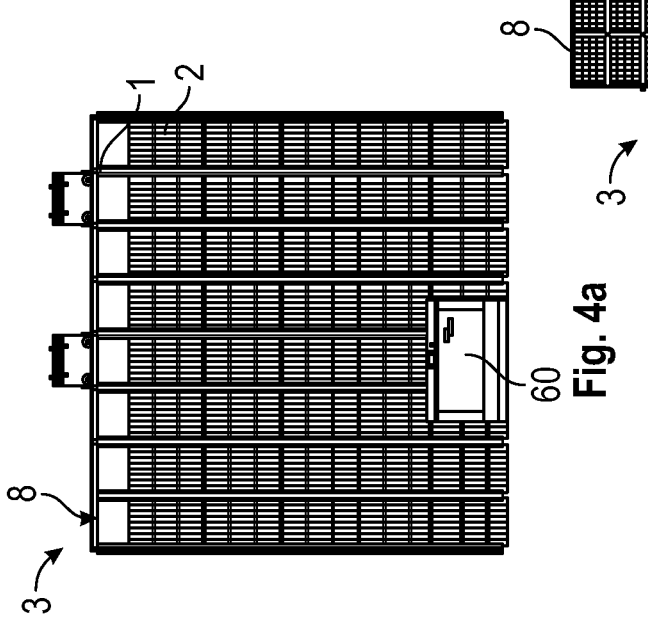

SYSTEM FOR DISTRIBUTING HEAVY BINS IN A STORAGE GRID

FIELD OF THE INVENTION

The present invention relates to a storage system for storing storage bins. The present invention also relates to a method for storing storage bins in a storage system.

BACKGROUND AND PRIOR ART

An example of a prior art storage system is illustrated in FIG. 1. The storage system 3 includes a bin storing grid 15 defining storage columns 8 into which storage bins 2 are stacked above each other by means of robot vehicles 1. The upper part of the grid 15 comprises a horizontal base 14 with supporting rails 13 onto which the robot vehicles 1 are moving. Each robot vehicle 1 comprises a bin lift for lifting storage bins 2 up from the storage columns 8 and for elevating storage bins 2 down into the storage columns 8.

In FIG. 1 it is further shown that the storage system 3 comprises a dedicated bin lift device 50, the latter being arranged to receive a storage bin 2 from the robot 1 at the top level of the storage system 3 and to convey the storage bin 2 down in a vertical direction to a delivery station, or port 60. At the port 60, items are inserted into or picked from, the storage bin 2, and thereafter, the storage bin 2 is returned to the grid via the bin lift device 50 and robot vehicle 1 again.

Details of a prior art vehicle relevant for use in the present storage system is disclosed in Norwegian patent NO317366.

In FIG. 2a-f, a storage bin 2 is shown in detail. As shown here, the storage bins 2 comprises reinforcement bars 2a provided in the bottom surface, the side surfaces and the upper edge defining the opening into the storage bin. These reinforcement bars 2a have the purpose of optimizing the strength of the storage bin while keeping the weight of the storage bin 2 itself low. Moreover, the purpose of the reinforcement bars 2a is to be able to manufacture the storage bins from a relatively cheap material. The present design of the storage bins is determined by the maximum expected load Wmax (i.e. weight) of the storage bins stacked above lowermost storage bin. Hence, the worst condition for the storage bin 2 is to be the lowermost storage bin in the columns. In FIG. 2a, one product item 80 is shown stored in the storage bin 2 while another product item 80 is shown above the storage bin.

This again causes the present storage system 3 to have a limitation in how many storage bins that can be stacked above each other and the weight of each storage bin. The present limits of the storage system in FIG. 1 is that the maximum weight of each storage bin (i.e. weight of storage bin 2 and its product items 80) are 30 kg. and that a maximum of 14 storage bins 2 can be stacked above each other per column 8. These limitations have also influenced the maximum height of the grid 15, where the height of the grid 15 typically corresponds to the height of 14 storage bins. Until recently, these limitations have been sufficient for most storage systems.

Today, overloading of the storage bins 2 are avoided by computing the maximum number of product items per storage bin 2, as the weight per product item in most cases are known from the manufacturer. In some storage systems, the weight of the storage bins 2 can be measured when there is doubt with respect to the 30 kg load limit. The weight of one type of storage bins used in present storage systems is ca 4-5 kg. Hence, they may carry up to a weight of 25-26 kg. of product items.

The object of the present invention is to provide a storage system and a method for storing storage bins which can handle storage bins with a weight higher than the previously determined maximum weight. Hence, in the above example, the object is to be able to store storage bins with a total weight of more than 30 kg.

A more specific object is to provide a method and system where the weight of each storage bin including its product items (i.e. weight of the storage bin itself and the product items stored within the storage bin) can be increased without reducing the stack of storage bins in each column.

Another more specific object of the invention is to increase the height of the grid. In the above example, this means that it is an object to provide a storage system and a method for storing storage bins where more than 14 storage bins can be stacked above each other.

Another object of the invention is to achieve the above objects of the invention without increasing the cost per storage bin considerably. Another object is that the method and system can be implemented in an already existing storage system without too many modifications.

SUMMARY OF THE INVENTION

The present invention relates to a method for storing product items in storage bins in a storage system comprising a bin storing grid in which storage bins are stored above each other in columns, where the method comprises the following steps:
- inserting product items to or retrieving product items from the respective storage bins at a port;
- determining a weight for each storage bin after one or more product items have been inserted to or retrieved from the storage bin;
- determining a storage position for the storage bin in the bin storing grid based on the weight;
- transporting the storage bin from the port to the determined storage position by means of a vehicle and a bin lift device provided on each vehicle.

In one aspect, the step of determining the weight for each storage bin comprises the step of weighing the storage bin by means of a weight sensor.

Alternatively, the step of determining the weight can be performed by estimating the weight based on a predetermined weight of each product item and the number of product items inserted into or retrieved from the storage bin. The predetermined weight could be the weight given by the manufacturer. In yet an alternative, each or all product items could be weighted by means of the weight before they are inserted into or after they have been retrieved from the storage bin.

The port is often referred to as a supply and/or retrieval port where the product items are supplied to or inserted into the storage bins or retrieved from or picked from the storage bin. In some storage systems, the same port is used for supply and retrieval, while in other storage systems, some ports are used for supply, while other ports are used for retrieval.

Preferably, the weight sensor is located at the port. Alternatively, the weight sensor is provided as part of the bin lift device of the vehicle. Here, the weight can be calculated based on the current drawn from a motor of the bin lift device during lifting of the respective storage bins.

Alternatively, the weight for each storage bin can be determined by means of the number of product items within the storage bin, the weight of each product item and the weight of the storage bin itself. As mentioned above, the weight of the storage bin used in present storage systems is 4-5 kg.

In one aspect, the step of determining the storage position further comprises the steps of:
  calculating a total weight for the storage bins presently being stored above the storage bin at the lowermost level of each column;
  selecting the storage position as a position in one of the columns in which the sum of the total weight and the weight of the new storage bin is below the maximum load tolerated by the lowermost storage bin being stored at a lowermost level of the bin storing grid.

In one aspect, the step of inserting product items to the respective storage bins comprises the steps of:
  overloading a first storage bin with product items;
  underloading a second storage bin with product items;
  where the storage positions for the respective first and second storage bins are in the same column.

In one aspect, the method further comprises the steps of:
  increasing the height of the bin storing grid for at least some columns.

In one aspect, the method further comprises the steps of:
  storing the total weight for all columns in the grid based on the weight and position of the storage bins;
  updating the total weight of each column each time a storage bin is removed from or added to the respective columns.

The present invention also relates to a storage system for storing product items in storage bins, where the storage system comprises:
  a bin storing grid in which storage bins are stored above each other in columns;
  a port where product items are inserted into or retrieved from the storage bins;
  a vehicle configured to move horizontally along rails provided on top of the bin storing grid, where the vehicle comprises a bin lifting device for transporting the storage bins horizontally and vertically between the bin storing grid and the port;
  a weight estimation device for estimating the weight of each storage bin after one or more product items have been inserted to or retrieved from the storage bin;
  a storage control system provided in communication with the vehicle and the weight sensor, where the storage control system is configured to determine a storage position for each storage bin based on the weight of the storage bin.

In one aspect, the weight estimation device is a weight sensor. In one aspect, the weight sensor is located in the port. According to this embodiment, only one or a few sensors are needed in each port.

In one aspect, the storage control system is configured to:
  calculating a total weight for the storage bins presently being stored above the storage bin at the lowermost level of each column;
  selecting the storage position as a position in one of the columns in which the sum of the total weight and the weight of the storage bin is below the maximum load tolerated by the lowermost storage bin being stored at a lowermost level of the bin storing grid.

In one aspect, storage control system is configured to store the total weight for all columns in the grid based on the weight and position of the storage bins, and to update the total weight of each column each time a storage bin is removed from or added to the respective columns.

According to the above, it is achieved that the maximum weight of one storage bin itself is no longer a limitation for the storage system. As mentioned in the introduction, the present maximum weight of each storage bin is 30 kg. With the method and system above, some storage bins may weigh more than 30 kg, i.e. they are overloaded or have a relatively higher weight, for example 35 or 40 kg. This is acceptable, as long as other storage bins in the same column have a weight below 30 kg, i.e. they are underloaded or have a relatively lower weight, for example 25 or 20 kg. Consequently, the maximum load for the storage bin at the lowermost level is not exceeded. It should be noted that this will require the bin lift device of each vehicle, and the vehicle itself, to be able to move a storage bin with a weight of more than 30 kg horizontally and vertically. Present vehicles are capable of this without further modifications.

The present invention can be implemented in many presently existing storage systems, without the need for replacing all storage bins. As the present storage bins are designed for the maximum load of storage bins stacked above the storage bin when the storage bin is on the lowermost level, the storage bin will also be able to carry product items which causes its weight to be 35-40 kg.

The present invention may also allow the height of the bin storing grid to be increased in storage systems where it is expected that a low percentage of storage bins have a weight of more than 30 kg. It is also possible to provide a storage system with taller columns dedicated to lighter bins and shorter columns for heavier bins. Available volume beneath the shorter columns may then be available for other type of equipment, temporary storage etc.

In the examples above, the storage bin having a weight of 4-5 kg and the load limit of 30 kg are of course used as examples only. The present invention described and discussed herein can be applied to other storage systems as well.

It should be noted that in most cases, there will be more than one possible storage position for a storage bin presently located at the port. In such a case, other criteria are used to decide which one to use. For example, a storage bin containing frequently picked product items should be stored closer to the port than storage bins containing rarely picked product items.

DETAILED DESCRIPTION

Embodiments of the present invention will now be described in detail with reference to the enclosed drawings, where:

FIG. 1 illustrates a perspective view of a prior art storage system;

FIG. 4a illustrates a front view of the storage system;

FIG. 4b illustrates a side view of the storage system;

FIG. 4c illustrates a top view of the storage system;

FIG. 5b illustrates a cross sectional view of the port device along line A-A of FIG. 5a;

Figure 2B:
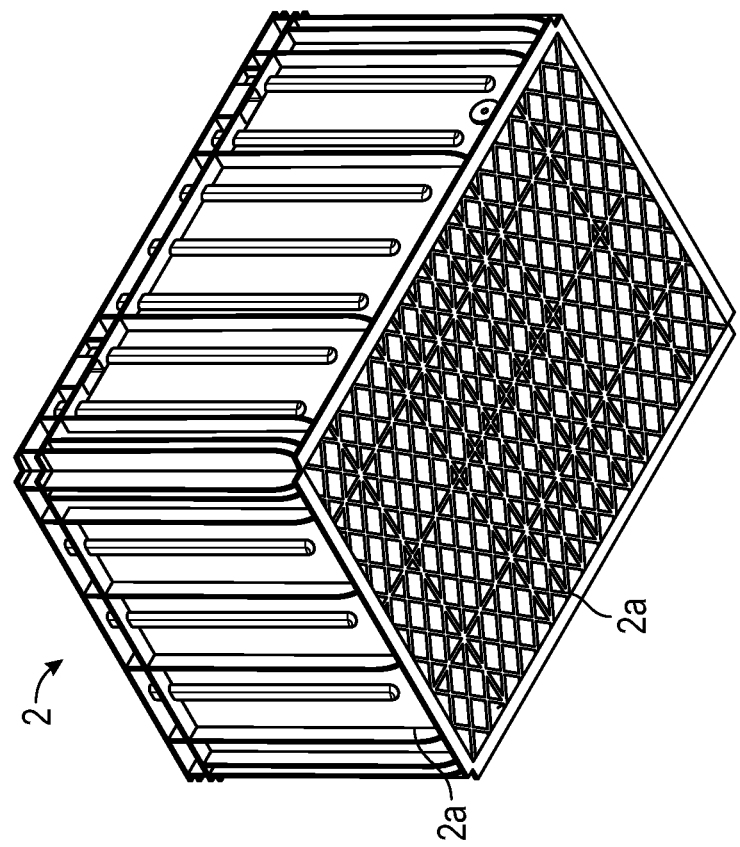
FIG. 2b illustrates a perspective view of the storage bin from below.
Figure 2A:
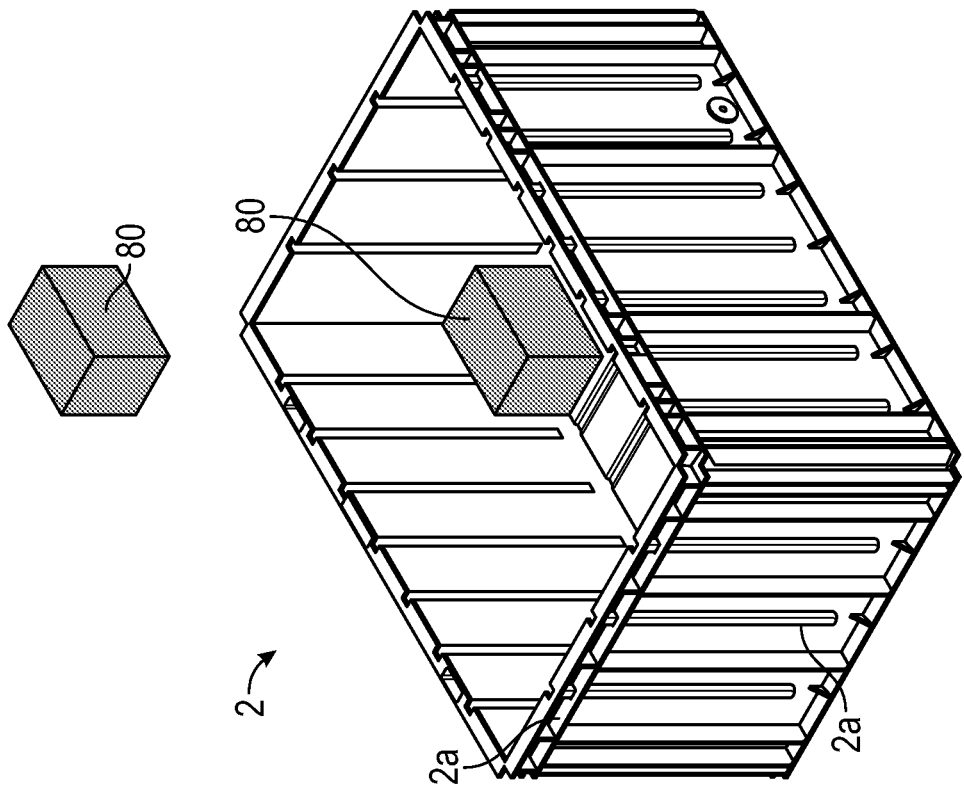
FIG. 2a illustrates a perspective view of a prior art storage bin from above.
Figure 2D:
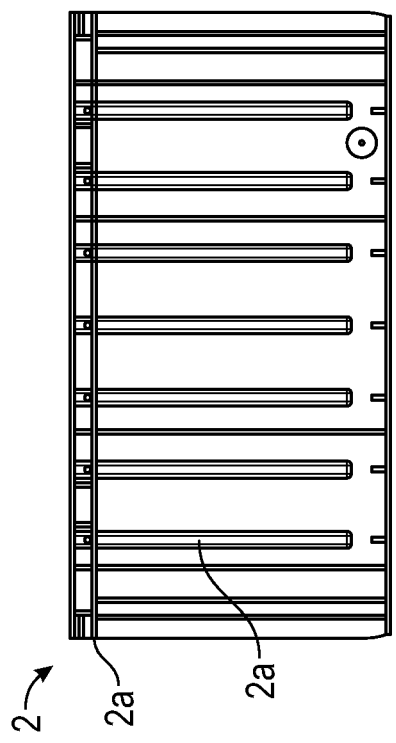
FIG. 2d illustrates a second side view of the storage bin.
Figure 2C:
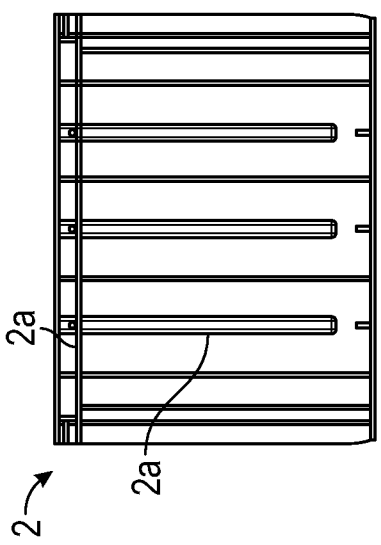
FIG. 2c illustrates a first side view of the storage bin.
Figure 2F:
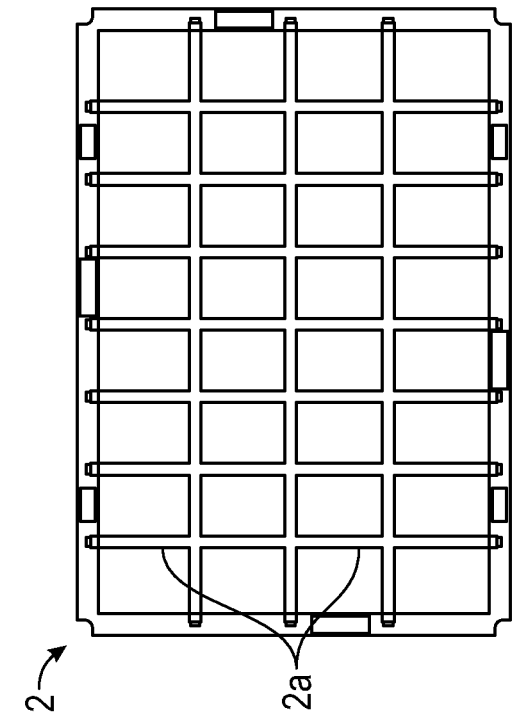
FIG. 2f illustrates a top view of a storage bin.
Figure 2E:
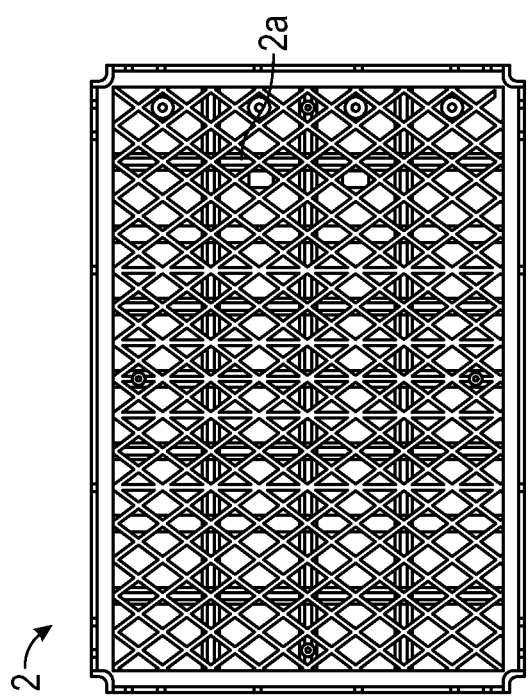
FIG. 2e illustrates a bottom view of the storage bin.
Figure 3:
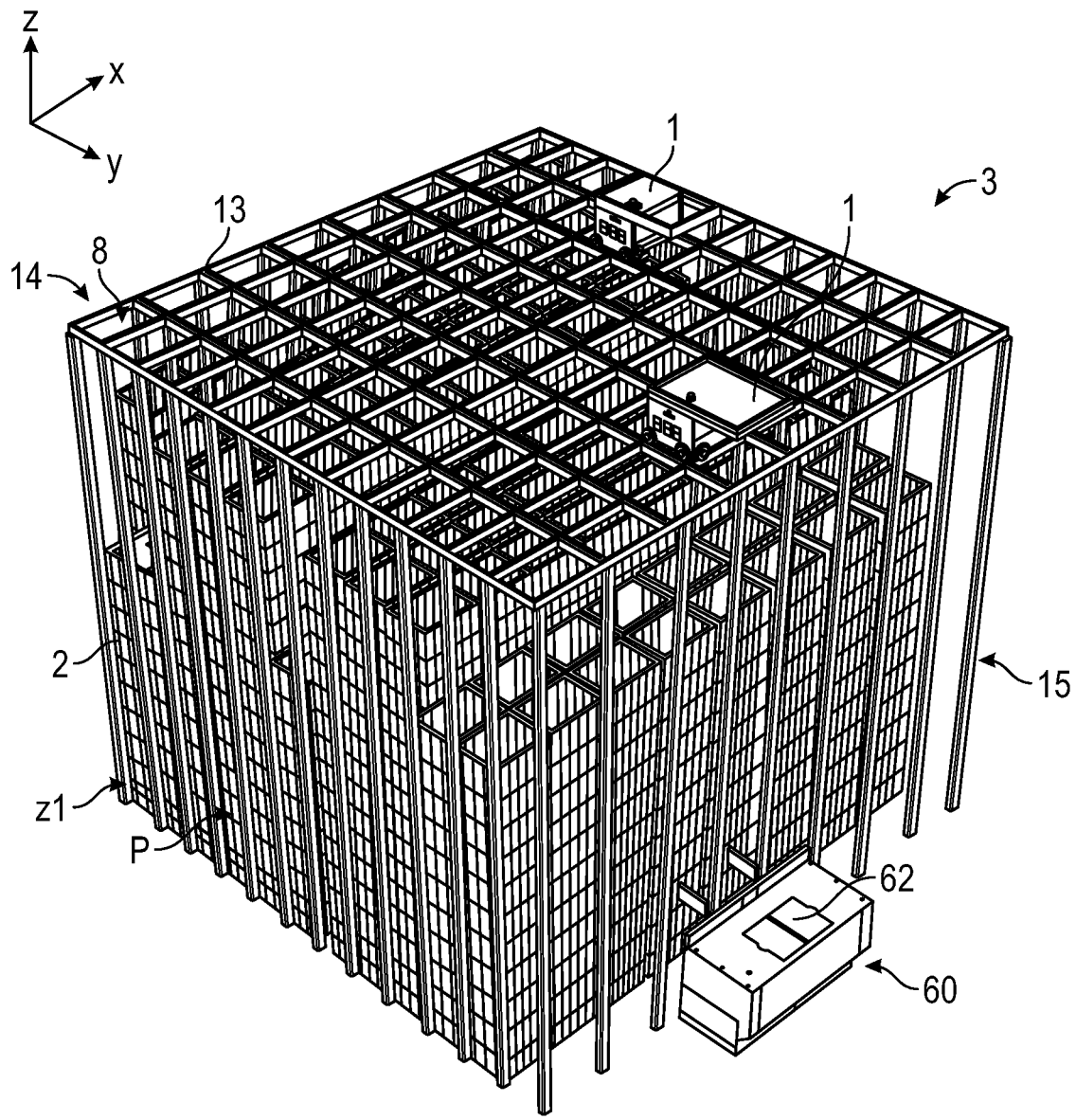
FIG. 3 illustrates a perspective view of the storage system.

It is now referred to FIG. 3 and FIG. 4a-c, where a storage system 3 is shown. The storage system 3 comprises a bin storing grid 15 formed by vertical and horizontal posts connected to each other. On top of the bin storing grid 15, a base 14 for vehicles 1 is formed, where the base 14 have rails 13 for the vehicle wheels. In the bin storing grid 15, storage bins 2 are stored by stacking them above each other in columns 8. A coordinate system is indicated in FIG. 3, with horizontal axis x and y and a vertical axis z. Hence, each storage position P can be referred to as a position defined by its x, y, z coordinate. The level of the lowermost storage bin 2 in each column 8 is referred to as level z1. In the present example, the level z1 corresponds to the floor of the building in which the grid 15 is located.

On the floor, adjacent to the bin storing grid 15, a port 60 is located. At this port 60, one or more product items may be retrieved from the storage bin 2, for example based on a picking order. At this port 60, product items 80 may also be supplied to the storage bin 2.

Figure 5B:
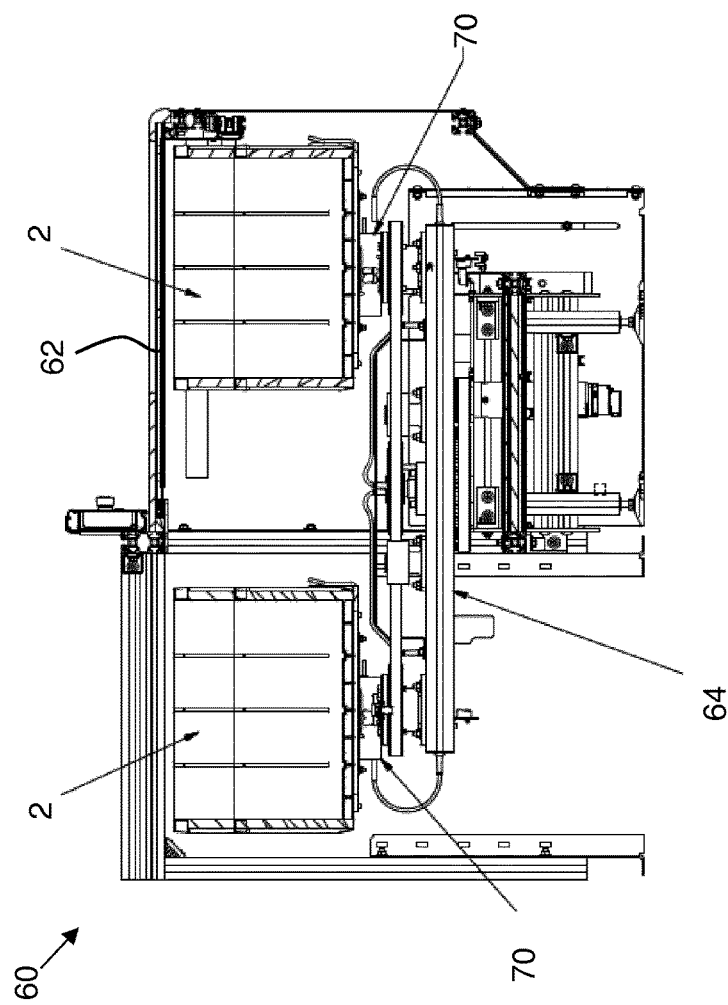
Figure 5A:
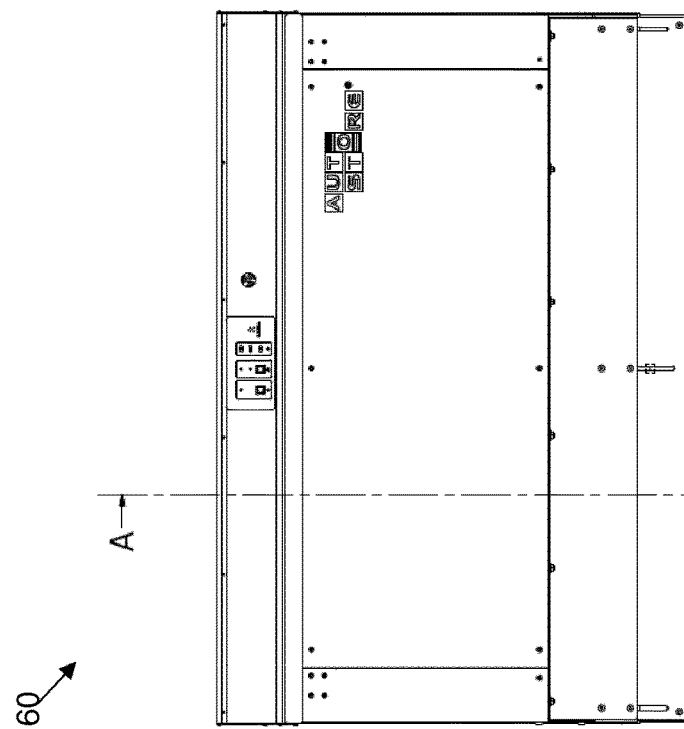
FIG. 5a illustrates a side view of the port device of FIGS. 3 and 4a-c.

In FIG. 5b, the position of the leftmost storage bin 2 is a position to which the vehicle 1 can deliver storage bins or from which the vehicle 1 can retrieve storage bins, while the position of the rightmost storage bin 2 is a position in which a person can pick/supply product items 80, provided that the lid 62 is open.

The positions of the storage bins in FIG. 5b are interchanged by rotation of a carrier arm 64 through 180 degrees.

The port 60 comprises lid 62 which is open when the storage bin is in the picking/supply position (i.e. a person may retrieve product items 80 from the storage bin or the person may insert product items 80 into the storage bin) and is closed when the storage bin is to be moved between the positions shown in FIG. 5b. The purpose of the lid 62 is to prevent hands being caught when the storage bins are moved between the positions in FIG. 5b. In FIG. 5b, reference number 70 denotes a weight sensor for measuring the weight of the storage bin 2 including the weight of the product items 80 stored within the storage bin 2. Due to carrier arm 64, there is one weight sensor on each side of the carrying arm 64. It should be noted that if the port 60 were of another type, for example having a conveyor belt or transportation rollers for moving the storage bin, then only one weight sensor 70 is required.

In these drawings, there are two vehicles 1, each comprising a bin lift device 4. In FIG. 4c, these vehicles are indicated as vehicle 1a and 1b. The vehicle 1a is driving over the columns 8 in which storage bins 2 are stored, while the vehicle 1b is positioned over the port 60 and is ready to retrieve the storage bin 2b from the port 60.

Figure 6:
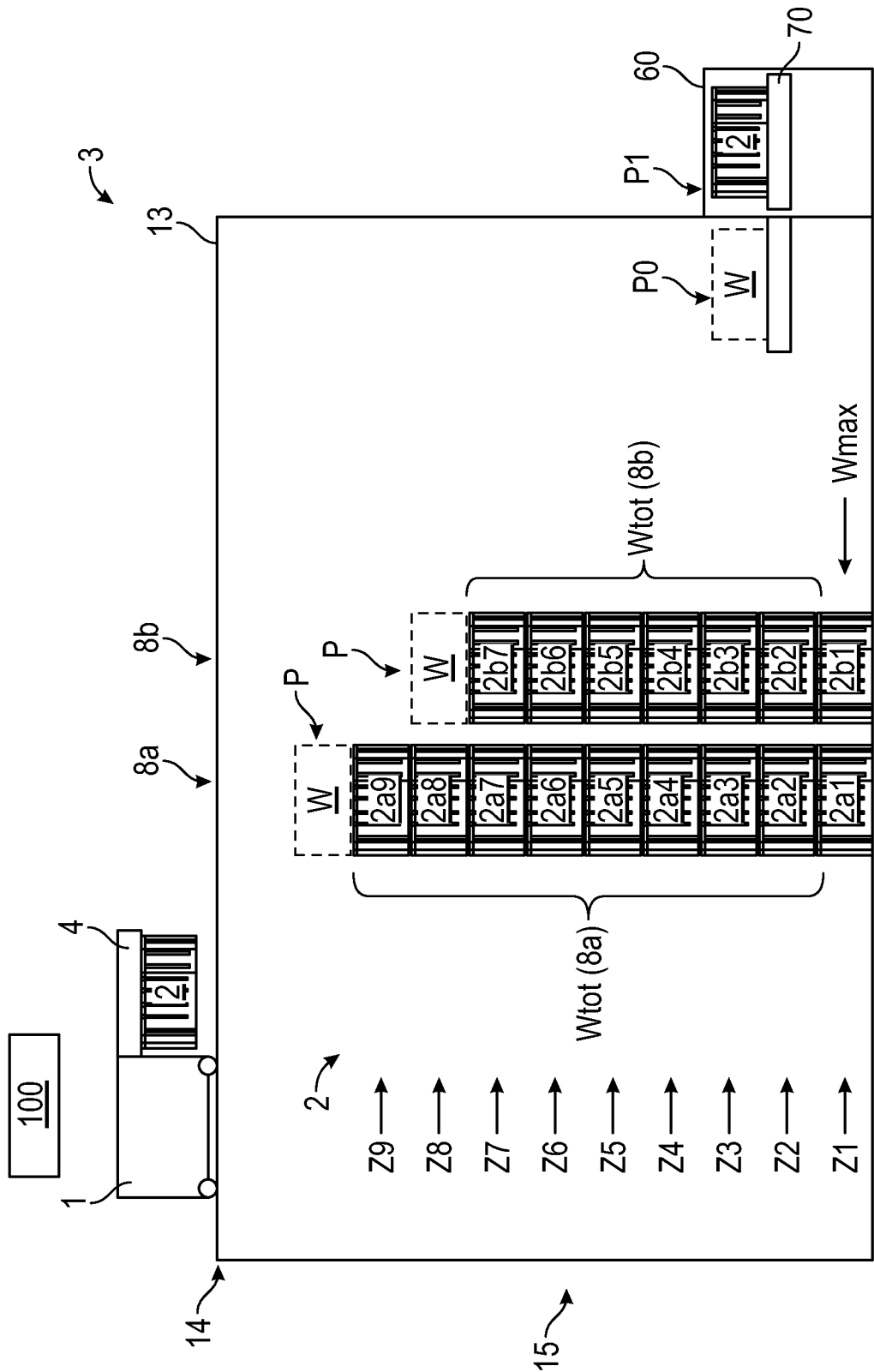
FIG. 6 illustrates a two stacks of storage bins with two possible storage positions.

The method according to the invention will now be described with reference to FIGS. 6 and 7. In FIG. 6, only two columns 8a and 8b are shown for simplicity. The first column 8a has nine storage bins 2a1, 2a2, 2a3, 2a4, 2a5, 2a6, 2a7, 2a8, 2a9. Here, the letter "a" indicates the column position. In a non-simplified example, the letter "a" will typically be a column referenced by means of x- and y-coordinates. The last number 1-9 indicates the height (z-coordinate). The second column 8b has seven storage bins 2b1, 2b2, 2b3, 2b4, 2b5, 2b6, 2b7.

In FIG. 6, a storage control system 100 is shown as a solid box above the vehicle 1. The storage control system 100 is provided in communication with the vehicle 1 and the weight sensor 70. The storage control system 100 will typically comprise a database containing the position of each storage bin in the grid 15 and the content of each storage bin 2. In addition, the storage control system 100 will now know the weight of each storage bin.

The storage control system 100 may send picking orders to vehicles and persons so that the correct storage bin 2 is retrieved from its column 8 and is transported to the port 60 where one or more product items 80 are picked from the storage bin based on the picking order. In the same way the storage control system 100 may generate supply orders when a shortage of certain product items are detected.

In FIG. 6, a total weight Wtot for the storage bins 2 presently being stored above the storage bin 2a1 at the lowermost level z1 in column 8a is indicated as Wtot (8a), while the total weight Wtot for the storage bins 2 presently being stored above the storage bin 2b1 at the lowermost level z1 of column 8b is indicated as Wtot (8b). As the weight and the positions for all storage bins 2 are known for the storage control system 100, the storage control system 100 may compute the total weight for all columns 8 in the grid 15.

The maximum load Wmax for the storage bin 2 being stored at a lowermost level z1 of the bin storing grid 15 is also determined. This will typically be a fixed value, equal for all storage bins 2, which are set in the storage control system 100. Of course, if there are several different types of storage bins 2, there might be one fixed value for the maximum load Wmax for each type of storage bin 2. In such a case, the storage control system 100 must also know the type of storage bin for all storage bins, for example by means of a type tag readable by a sensor, an identification tag for each storage bin 2 readable by a sensor etc. In the present example, the maximum load Wmax is determined as a maximum of 14 fully loaded storage bins, i.e. Wmax=14*30=420 kg.

Figure 7:
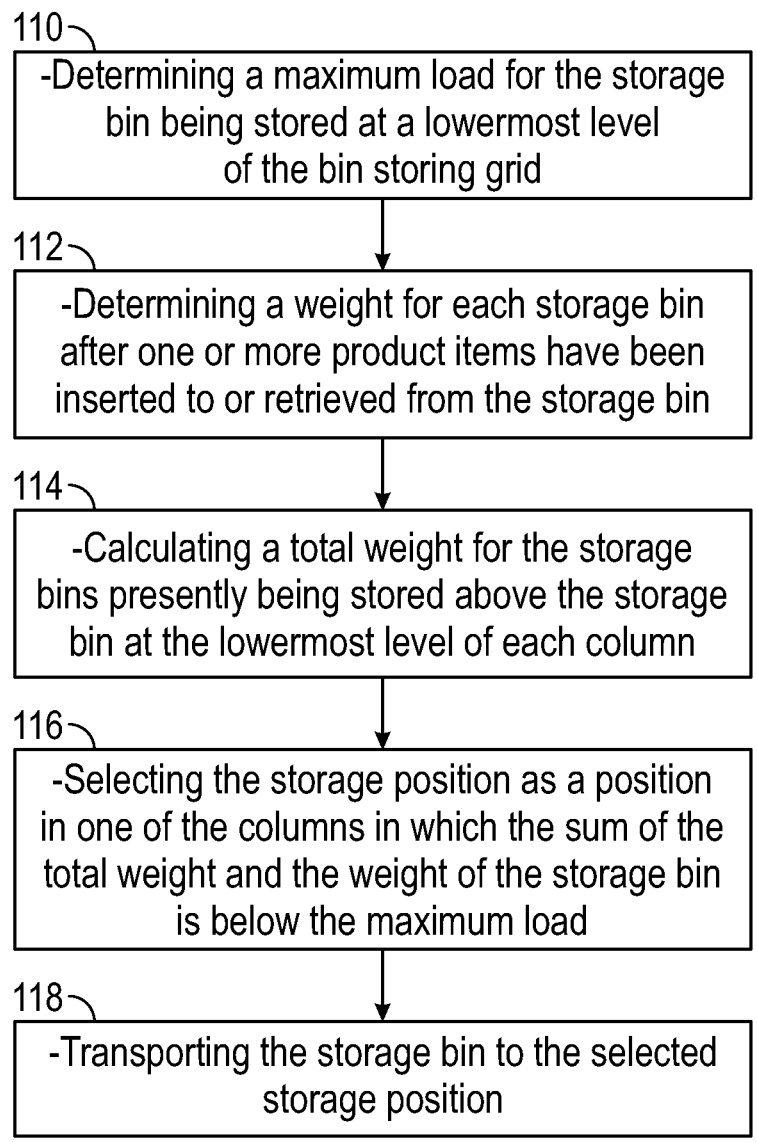
FIG. 7 illustrates a flow diagram of a method for storing storage bins in a storage system.

The determination of the maximum load Wmax is considered to be a first step 110 of the method shown in FIG. 7.

It is now referred to FIG. 6 again. Based on a picking order, the vehicle 1 is moving a storage bin 2 containing the product item 80 to be picked to the port 60 at position P0.

Then, the storage bin 2 is moved to position P1, where the content of the storage bin 2 is accessible for a person or picking robot (not shown) for picking (alternatively supplying) the product item 80 from the storage bin 2. As described above, the movement from the position P0 to the position P1 is performed by the port 60 itself.

Then, the storage bin 2 is moved to the position P0 again. As described above, the movement from the position P1 to the position P0 is performed by the port 60 itself. At the position P0, the storage bin 2 is ready for retrieval by means of a vehicle 1 again.

After visiting the port 60, the weight of the storage bin 2 is measured by the weighing sensor 70, and this weight is registered by the storage control system 100. This is shown in FIG. 7 as step 112.

In step 114, the storage control system 100 is calculating the total weight Wtot for the storage bins presently being stored above the storage bin at the lowermost level of each column. In the example above, this equals Wtot (8a) and Wtot (8b). This step may be performed before step 112. For example, the total weight Wtot may be stored in a database for each column, where the value for each column is updated each time a storage bin 2 is removed from or added to the stack of storage bins.

In step 116, the sum of the total weight Wtot and the weight W of the storage bin 2 currently being at position P0 is determined and compared with the maximum load Wmax for each column. One storage position P or a number of possible storage positions P are calculated as columns with available space, where the sum of the total weight Wtot and the weight W is below the maximum load Wmax.

If there is more than one possible storage position P, then other criteria are used to decide which one to use. For example, a storage bin 2 containing frequently picked product items 80 should be stored closer to the port 60 than storage bins 2 containing rarely picked product items 80. In the example of FIG. 6, if the storage bin 2 at the position P0 contains frequently picked product items 80, then the storage position P in column 8*b* should be selected, as this column 8*b* is closer to the port 60. If the storage bin 2 at the position P0 contains rarely picked product items 80, then the storage position P in column 8*a* should be selected.

In step 118, one of the vehicles 1 is then controlled to pick up the storage bin 2 at position P0 and then transport it to the storage position P.

The above method will typically be implemented as software in the storage control system 100.

It should be noted that it is possible to install the above method in an already existing storage system 3 where the weight of each storage bin 2 is currently not known. The only requirement is that the software of the storage control system 100 must be updated and that the storage system 3 is updated with a weight estimation device, typically a weight sensor 70, provided in communication with the storage control system 100.

The storage system 3 can be operated as normal or close to normal. A few columns 8 must be emptied. These columns 8 are then used initially to receive all storage bins 2 which have its weight registered by the weight sensor. As more and more storage bins are weighed, more and more columns 8 are filled with storage bins 2 which have had its weight registered. In less busy periods, a storage bin 2 which has not been weighed may be transported to the weight sensor to have its weight registered. After a period of time, the weights of all storage bins are registered.

It should be noted that in the description above, the port 60 is connected directly to the grid 15. Alternatively, the port 60 may be connected to the grid 15 at a distance from the grid 15, for example by means of a conveyor belt assembly or other transporting systems. In such a case, the weight sensor could be implemented as part of such a transporting system. In yet an alternative, the weight sensor 70 could be provided in the vehicle 1 itself, for example by calculating the weight based on the current drawn from a motor of the bin lift device 4 during lifting of the respective storage bins.

LIST OF REFERENCE NUMBERS

1 Vehicle
2 Storage bin
3 Storage system
4 Bin lift device
8 Columns
13 Rails
14 Horizontal base
15 Bin storing grid
60 Port
62 Lid
64 Carrier arm
70 Weight estimation device/Weight sensor
80 Product item
100 Storage control system
P Storage position
P0 Position
P1 Position
z1 Lowermost level

The invention claimed is:

1. A method for storing product items in storage bins in a storage system comprising a bin storing grid in which storage bins are stored above each other in columns, wherein the method comprises:
   inserting product items to or retrieving product items from the storage bins at a port;
   overloading a first storage bin with product items;
   underloading a second storage bin with product items;
   determining a weight for each storage bin after one or more product items have been inserted to or retrieved from each storage bin;
   determining a storage position for each storage bin in the bin storing grid based on the determined weight;
   calculating a total weight for storage bins presently being stored above a storage bin at a lowermost level of each column;
   selecting the storage position for each storage bin as a position in one of the columns in which a sum of the total weight and the weight of the storage bin at the lowermost level is below a maximum load tolerated by the storage bin at the lowermost level of the bin storing grid; and
   transporting storage bins from the port to the determined storage position by means of a vehicle and a bin lift device provided on each vehicle;
   wherein the storage positions for the first and the second storage bins are in a same column.

2. The method according to claim 1, wherein determining the weight for each storage bin comprises weighing the storage bin by means of a weight sensor.

3. The method according to claim 1, further comprising:
   increasing a height of the bin storing grid for at least some columns.

4. The method according to claim 1, further comprising:
   storing the total weight for all columns in the grid based on the weight and position of the storage bins; and
   updating the weight of each column each time a storage bin is removed from or added to the respective columns.

5. A storage system for storing product items in storage bins, wherein the storage system comprises:
   a bin storing grid in which storage bins are stored above each other in columns;
   a port where product items are inserted into or retrieved from the storage bins;
   a first storage bin overloaded with product items;
   a second storage bin underloaded with product items;
   a vehicle configured to move horizontally along rails provided on top of the bin storing grid, wherein the vehicle comprises a bin lifting device for transporting the storage bins horizontally and vertically between the bin storing grid and the port;
   a weight estimation device for estimating the weight of each storage bin after one or more product items have been inserted to or retrieved from the storage bin; and
   a storage control system provided in communication with the vehicle and the weight estimation device, wherein the storage control system is configured to determine a storage position for each storage bin based on the weight of the storage bin, calculate a total weight for storage bins presently being stored above a storage bin at a lowermost level of each column, and for storage position bin as a position in one of the columns in which a sum of the total weight and the weight of each storage bin is below a maximum load tolerated by a lowermost storage bin being stored at the lowermost level of the bin storing grid;

wherein the storage positions for the first and the second storage bins are in a same column.

6. The storage system according to claim 5, wherein the weight estimation device is a weight sensor.

7. The storage system according to claim 6, wherein the weight sensor is located in the port.

8. The storage system according to claim 5, wherein storage control system is configured to store the total weight for all columns in the grid based on the weight and position of the storage bins, and to update the total weight of each column each time a storage bin is removed from or added to the respective columns.

* * * * *